(12) United States Patent
Brewer

(10) Patent No.: US 6,286,388 B1
(45) Date of Patent: Sep. 11, 2001

(54) VEHICLE PEDAL ASSEMBLY

(75) Inventor: Michael Edward Brewer, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/547,124

(22) Filed: Apr. 11, 2000

(51) Int. Cl.$^7$ .............................. G05G 1/14; B60K 28/14
(52) U.S. Cl. .............................................................. 74/512
(58) Field of Search ................................ 74/512, 513, 514, 74/560

(56) References Cited

U.S. PATENT DOCUMENTS

| | | | |
|---|---|---|---|
| 3,388,610 | * | 6/1968 | Pyle et al. .............................. 74/512 |
| 3,945,672 | | 3/1976 | Wong ....................................... 293/5 |
| 4,964,485 | | 10/1990 | Miele .................................... 180/275 |
| 5,249,646 | | 10/1993 | Thiel .................................... 188/71.9 |
| 5,632,184 | | 5/1997 | Callicutt et al. ......................... 74/512 |
| 5,778,732 | | 7/1998 | Patzelt et al. ........................... 74/512 |
| 5,848,558 | | 12/1998 | Isono et al. ............................. 74/512 |
| 5,848,662 | | 12/1998 | Sakaue .................................. 180/274 |
| 5,896,781 | | 4/1999 | Müller ..................................... 74/512 |
| 5,916,330 | | 6/1999 | Jacobson ................................. 74/512 |
| 5,921,144 | | 7/1999 | Williams, Jr. et al. ................. 74/512 |
| 6,112,615 | * | 9/2000 | Nawata et al. .......................... 74/512 |

FOREIGN PATENT DOCUMENTS

| | | | |
|---|---|---|---|
| 19634257 | | 3/1997 | (DE) . |
| 0229350 | * | 7/1987 | (EP) ....................................... 74/512 |
| 0719697 | | 7/1996 | (EP) . |

* cited by examiner

Primary Examiner—Mary Ann Green
(74) Attorney, Agent, or Firm—Gregory Brown

(57) ABSTRACT

A brake pedal assembly 12 for a vehicle includes a pedal 14 and a foot pad 16 operatively engageable by the operator of a vehicle. The pedal assembly 12 also includes a collapsible push rod 22 connected between the pedal 14 and a hydraulic actuator assembly 20. The push rod 40 has a transverse slot 44 formed therein with a tapered surface 46 that increases in separation distance from a first end 48 toward a second end 50. A pin 42 is disposed in the second end of the slot 44 for connecting the push rod 40 to pedal 14 during normal vehicle operation. The pin 42 is movable toward the second end of slot 44 upon experiencing a force greater than a predetermined force threshold. In doing so, pin 42 deforms slot 44 of push rod 40 in an energy consuming manner to reduce the amount of force otherwise applied to pedal 14. Accordingly, the pedal assembly 12 reduces forces that may otherwise be transferred to the operator of the vehicle during a collision.

17 Claims, 2 Drawing Sheets

VEHICLE PEDAL ASSEMBLY

FIELD OF THE INVENTION

The present invention generally relates to vehicle pedal assemblies and, more particularly, to a pedal assembly, such as a brake pedal assembly, that is releasable from a normal operative condition upon imposition of a frontal load to an automotive vehicle.

BACKGROUND OF THE INVENTION

It is generally known in the automotive vehicle design arts that it is desirable to configure components arranged within the passenger compartment of the vehicle to reduce adverse effects on the vehicle occupants when subjected to high forces that are experienced in a collision. While many vehicle interior components facing the vehicle occupants are designed to minimize the forces during a collision impact, foot pedal assemblies, such as the brake pedal assembly which is generally positioned below the instrument panel of the vehicle in the driver's compartment, may transfer collision caused impact forces to the driver's leg. Likewise, the reaction of the occupant in the collision can force the occupant's legs into the foot pedal controls.

Conventional foot pedal assemblies, such as the brake pedal, clutch pedal, and acceleration pedal assemblies, are commonly assembled together in a pedal box assembly which typically is rigidly connected to the vehicle dash. Foot pedal assemblies employed with hydraulic fluid actuated systems, such as the brake pedal assembly, generally have a foot pedal pad connected to a pedal lever which in turn is assembled to a booster piston push rod. Axial actuation of the piston push rod, with assist from the vacuum booster, compresses a master cylinder which, in turn, generates hydraulic fluid pressure. During a frontal load imposition, such as that experienced during a severe frontal collision, vehicle impact forces may be instantly transmitted through the brake actuation system to the occupant.

One approach to minimizing such forces during a severe frontal collision includes structurally connecting the pedal box assembly to a cowl structure which remains relatively stable relative to the dash panel. With the pedal box assembly structurally connected to the cowl structure, relative movement can be made to cause a failure in the structure supporting the pivots of the pedal box assembly, thus allowing the pedals to move freely with little constraint following a severe frontal collision. Other approaches have included the use of mechanical connections, such as a cable, between the cowl or some other relatively stable structure, and the pedal box. With these approaches, the deflection of the pedal assembly relative to the stable structure during a severe frontal collision is used to actively depress the pedal through the action of the aforementioned mechanical connection. However, the aforementioned approaches significantly increase the cost and complexity of the pedal box assembly and may render the pedal assemblies inoperative following a vehicle collision.

Accordingly, there exists a need, heretofore unfulfilled, for a cost efficient pedal assembly for use in a vehicle, that reduces the intrusion forces imparted to an occupant of the vehicle, and which reduces the forces imparted upon the occupant as the occupant reacts against the pedal assembly, during a collision event.

SUMMARY OF THE INVENTION

In accordance with the teachings of the present invention, a pedal assembly, such as a brake pedal assembly, for a vehicle is provided which reduces collision caused impact forces applied to the pedal assembly during a vehicle collision. The pedal assembly includes a pedal operatively engageable by a vehicle operator and a push rod. Preferably, the push rod is adapted to be assembled to an actuator assembly for generating an amount of pressurized fluid. The push rod includes a transverse slot having a tapered surface such that the slot decreases in distance from a first position toward a second position of the slot. The push rod is operatively coupled to the pedal via a connecting pin which is disposed in the transverse slot. The pin is disposed in the first position during normal vehicle operation. Upon experiencing a force above a predetermined threshold force, the pin is slidably movable within the transverse slot toward the second position in an energy consuming manner to collapse the push rod relative to the pin. Accordingly, the pedal assembly of the present invention advantageously reduces forces transferred to the pedal during a collision.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
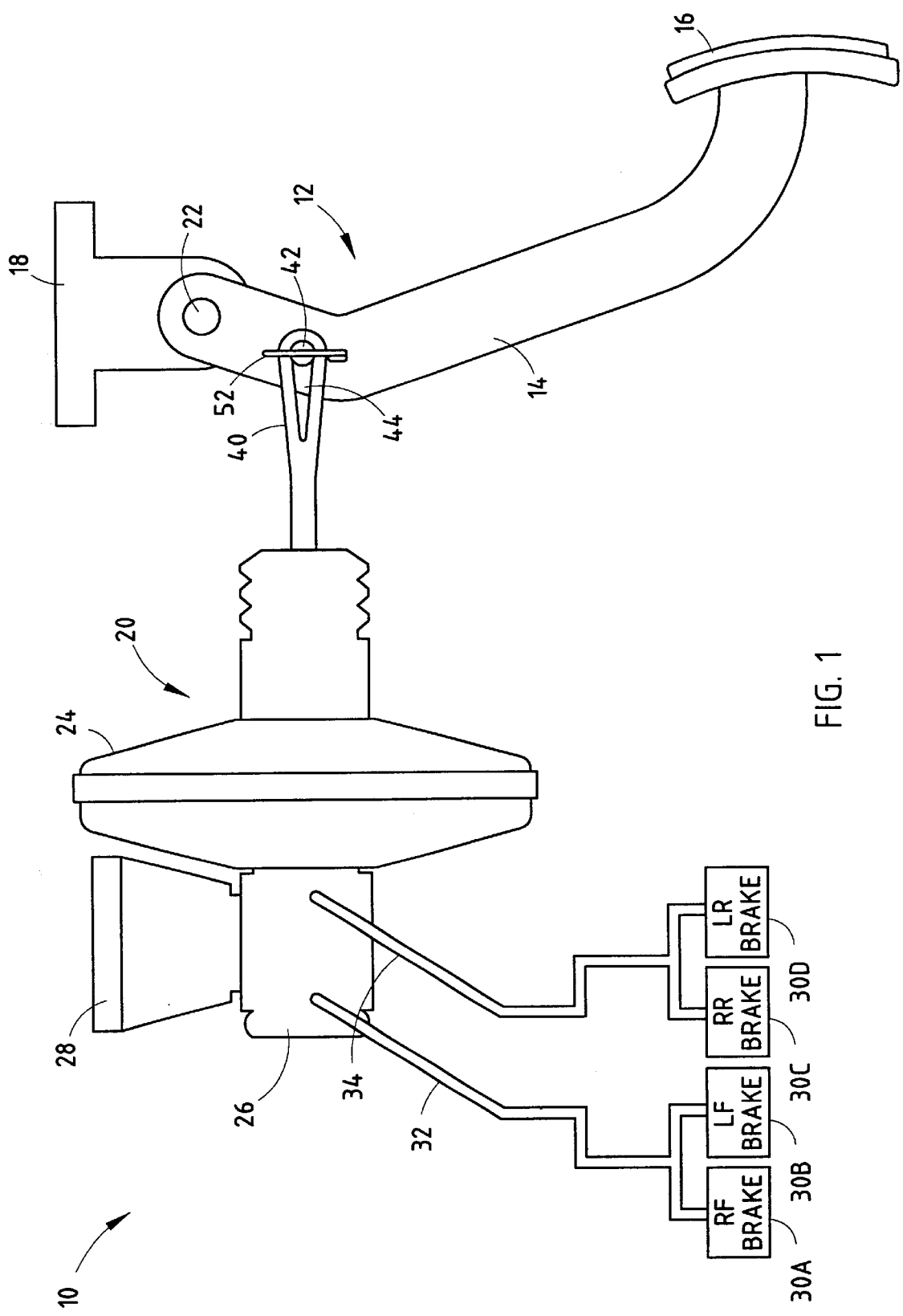
FIG. 1 is a diagrammatic view of a brake pedal system having a brake pedal assembly employing a collapsible push rod according to the present invention.

Referring to FIG. 1, a hydraulic brake system 10 is shown according to the present invention for use in braking a vehicle, such as an automobile. The brake system 10 has a brake pedal assembly 12 generally located in the passenger compartment, and generally defined rearward of a dash panel in the vehicle. The brake pedal assembly 12 includes an elongated pedal 14 pivotally mounted at its upper end to a pivotal connection 18 which, in turn, is generally rigidly secured to the dash panel. Proximate the lower end of the pedal 14 is a pedal pad 16 configured to be operatively engageable with the foot of the vehicle operator, i.e., driver, to pivot the pedal 14 clockwise as shown in FIG. 1 so as to actuate the braking system. The brake pedal assembly 12 further includes a collapsible, i.e., deformable, brake pressure push rod 22 assembled at one end to pedal 14 via a connecting pin 42. Collapsible brake pressure push rod 22 is axially movable in cooperation with pedal 14 and operatively engages a brake actuator assembly 20 at the other end. As described in greater detail below, brake pressure push rod 22 operates as a rigid push rod to actuate braking operation of the vehicle during normal vehicle operating conditions, and is collapsible relative to pin 42 and pedal 14 so as to absorb energy and to reduce the transfer of forces, such as impact forces, to the foot of the operator during a frontal impact collision of the vehicle.

The brake actuator assembly 20 is equipped with a vacuum booster 24, a brake master cylinder 26, and a hydraulic fluid storage reservoir 28. Storage reservoir 28 contains a reserve of non-pressurized hydraulic brake fluid. The vacuum booster 24 provides assist to the brake pressure push rod 22 to actuate the master cylinder 26. The master cylinder 26, in cooperation with the vacuum booster 24, generates a controlled amount of hydraulic fluid pressure in response to axial movement of the brake pressure push rod 22 which, in turn, is responsive to operator actuation of pedal pad 16, as is generally known in the vehicle brake art. The brake actuator assembly 20 made up of vacuum booster 24, master cylinder 26 and reservoir 28, as well as pedal 14 and pedal pad 16 of the brake pedal assembly 12, may include conventional brake system assemblies.

The vehicle brake system 10 is shown having four brakes including right front brake 30A, left front brake 30B, right rear brake 30C, and left rear brake 30D, according to one example. Brakes 30A–30D provide friction braking to brake the corresponding wheels on the vehicle in response to the hydraulic fluid pressure generated by the actuator assembly 20. Each of brakes 30A–30D may include conventional brake assemblies made up of calipers/cylinders and brake pads as is commonly known in the vehicle brake art.

In addition, primary and secondary brake hydraulic circuits 32 and 34 provide hydraulic brake fluid flow paths between the master cylinder 26 and each of brakes 30A–30D. According to the example shown, hydraulic circuit 32 is coupled to brakes 30A and 30B, while hydraulic circuit 34 is coupled to brakes 30C and 30D. However, it should be appreciated that one or more hydraulic circuits may be employed and may be otherwise connected to one or more vehicle brakes. For example, the brake hydraulic circuits could be diagonally biased, as is commonly known in the vehicle brake art.

Figure 3:
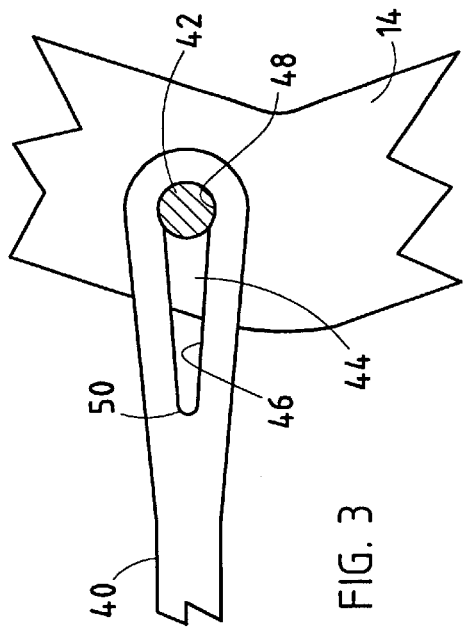
FIG. 3 is a partial diagrammatic view of the collapsible push rod shown in the non-collapsed position during normal vehicle operation.
Figure 4:
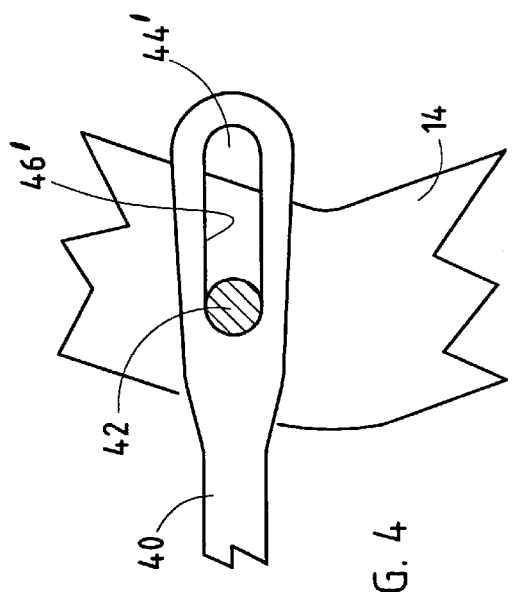
FIG. 4 is a partial diagrammatic view of the collapsible push rod shown in the collapsed position during a vehicle collision.
Figure 2:
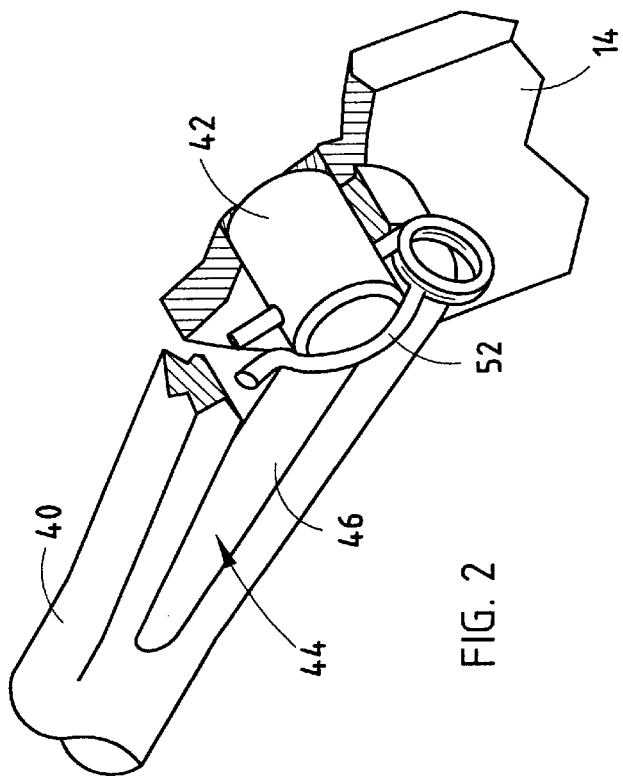
FIG. 2 is an enlarged assembly view, partially cut away, of a portion of the brake pedal assembly.

According to the present invention, a collapsible brake pressure push rod 40 is employed in the pedal assembly 12 as is more particularly shown in FIGS. 2–4. Referring to FIG. 2, the brake pressure push rod 40 is made up of a generally cylindrical rod member that is transformed to provide edges at one end according to one embodiment. While a cylindrical rod having a generally circular cross section is shown, it should be appreciated that push rod 40 may otherwise be configured in a rectangular cross section or other shape. Rod member 40 is operatively engaged at one end with the vacuum booster 24, while the other end of push rod 40 is assembled to pedal 14. The push rod 40 has a transverse slot 44 formed by a tapered wedge surface 46. Slot 44 includes the tapered wedge surface 46 so that the slot 44 is wider at a first end adjacent to pedal 14 and narrows toward the second end. According to one embodiment, the angle of taper of slot 44 is preferably within the range of five to thirty degrees. At the first end of the slot 44 is an enlarged rounded portion 48 that substantially conforms to the shape and size of the connecting pin 42. Round portion 48 is intended to matingly engage and hold pin 42 in place during normal vehicle operation, and allows pin 42 to rotate therein.

Connecting pin 42 may include a round cylindrical pin having a retainer 52, shown as a spring clip, engaged in a through hole at one end for preventing disengagement of pin 42 from slot 44. Pin 42 extends through slot 44 and is welded to pedal 14 at the opposite end according to one embodiment. Alternately, pin 42 may extend through pedal 14 and have an enlarged head and/or other retaining member at opposite ends to hold pin 42 in place with slot 44 and pedal 14. Accordingly, the retainer 52 at one end or both ends of connecting pin 42 maintains the relative assembly of rod 40 with lever 14.

As is particularly shown in FIG. 3, the push rod 40 normally operates in a non-collapsed position with pin 42 disposed within rounded portion 48 at one end of slot 44 during normal vehicle operation. Forces are transferred from pedal 14 to connecting pin 42 to push rod 40 to provide actuation to the master cylinder responsive to operator actuation of the foot pad. According to the preferred embodiment, push rod 40 is made of a rigid material such as steel having deformable properties that allow for the deformation of slot 44 upon experiencing a predetermined axial force and for consuming energy as pin 42 is actuated axially from the first end 48 of slot 44 toward the narrower second end 50.

Referring to FIG. 4, the push rod 40 is shown in a collapsed (i.e., deformed) position after experiencing axial force greater than the predetermined threshold force. The pin 48 and push rod 40 are actuatably movable relative to one another upon experiencing an axial force greater than the predetermined threshold force, such as that caused by intrusion forces present during a severe frontal vehicle collision or excessive force applied to the pedal assembly by a vehicle operator which may also be caused by a severe front vehicle collision. The predetermined threshold force is preferably greater than the force normally experienced during normal vehicle operation, yet at a sufficient level to deform push rod 40 and absorb energy during a vehicle collision. According to one example, the predetermined threshold force is equal to approximately 450 pounds of force applied to the pedal foot pad 16.

Upon experiencing a force greater than the predetermined force threshold, pin 42 moves from the normal operating portion at the first end 48 of slot 44 towards the narrower second end 50. In doing so, pin 42 deforms tapered slot 44 as shown by slot 44' by applying force to wedge the tapered surface 46 radially outward as pin 42 moves towards the narrowing end 50. In doing so, the movement of pin 42 against tapered surface 46 forms deformed surface 46' in an energy consuming manner so as to absorb and reduce the amount of force that would otherwise be transferred to the pedal 14 and foot pad 16 so as to reduce the amount of force transferred to the lower extremities of a vehicle operator. The amount of axial movement of pin 42 is limited in distance so that the brake assembly may still function to provide braking following deformation of push rod 40 following a vehicle collision.

While push rod 40 is shown having a single member connected to connecting pin 42 with a tapered slot 44, it should be appreciated that other shapes and sizes of push rod 40 may be employed. For example, push rod 40 may include a clevis having two members both connected to pin 42, with each member having a tapered slot 44 that deforms upon experiencing an axial force by pin 42 during a vehicle collision.

Accordingly, the brake pedal assembly 12 of the present invention advantageously absorbs energy and reduces force transferred to the foot of an operator upon imposition of a detected frontal load of the vehicle. The brake pedal assembly 12 is inexpensive, enables commonality between different vehicle platforms, and is compatible with adjustable pedals. While the present invention has been described herein in connection with reducing forces, such as impact forces, transferred through a hydraulic brake pedal assembly during a vehicle collision, it should be appreciated that the present invention may be used with other types of pedal assemblies to minimize adverse affects on the vehicle occupants. For example, the present invention may be used to reduce such forces transferred through a hydraulic clutch assembly pedal.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A pedal assembly for a vehicle, said pedal assembly comprising:
   a pedal operatively engageable by a vehicle operator;
   a push rod adapted to be assembled to an actuator, said push rod having a transverse slot formed therein, said slot having a tapered surface such that said slot decreases in distance from a first position toward a second position of the slot; and
   a pin disposed in said slot of said push rod for operatively engaging said push rod with said pedal, said pin being positioned in the first position of said slot during normal vehicle operation and movable toward the second position in an energy consuming manner upon experiencing an amount of force greater than a predetermined force threshold.

2. The pedal assembly as defined in claim 1, wherein said push rod is collapsible relative to said pin.

3. The pedal assembly as defined in claim 2, wherein said slot deforms on said pin and moves from said first position to said second position.

4. The pedal assembly as defined in claim 1, wherein said pedal assembly comprises a brake pedal assembly.

5. The pedal assembly as defined in claim 1, wherein said slot further comprises a round portion at said first position for receiving said pin, wherein said pin is substantially cylindrical.

6. The pedal assembly as defined in claim 1, wherein said tapered surface tapers at an angle in the range of five to thirty degrees.

7. A releasable pedal system for an automotive vehicle, said system comprising:
   a pedal assembly including a pedal operatively engageable by a vehicle operator;
   an actuator assembly for generating an amount of force responsive to the pedal assembly;
   a push rod connected to the actuator assembly, said push rod having a transverse slot formed therein, said slot having a tapered surface such that said slot decreases in distance from a first position toward a second position of the slot; and
   a pin disposed in said slot of said push rod for operatively engaging said push rod to said pedal, said pin being positioned in the first position of said slot during normal vehicle operation and movable toward the second position in an energy consuming manner upon experiencing an amount of force greater than a predetermined force threshold.

8. The pedal system as defined in claim 7, wherein said push rod is collapsible relative to said pin.

9. The pedal system as defined in claim 8, wherein said slot deforms on said pin and moves from said first position to said second position.

10. The pedal system as defined in claim 7, wherein said pedal system comprises a brake pedal system.

11. The pedal system as defined in claim 7, wherein said slot further comprises a round portion at a first end for receiving said pin, wherein said pin is substantially cylindrical.

12. The pedal system as defined in claim 7, wherein said tapered surface tapers at an angle in the range of five to thirty degrees.

13. A brake pedal assembly for an automotive vehicle, said brake pedal assembly comprising:
   a brake pedal operatively engageable by a vehicle operator;
   a push rod adapted to be assembled to an actuator, said push rod having a transverse slot formed therein, said slot having a tapered surface such that said slot decreases in diameter from a first position toward a second position of the slot; and
   a pin disposed in said slot of said push rod for operatively engaging said push rod to said pedal, said pin being positioned in the first position of said slot during normal vehicle operation and movable toward the second position in an energy consuming manner upon experiencing an amount of force greater than a predetermined force threshold.

14. The pedal assembly as defined in claim 13, wherein said push rod is collapsible relative to said pin.

15. The pedal assembly as defined in claim 14, wherein said slot deforms on said pin and moves from said first position to said second position.

16. The pedal assembly as defined in claim 13, wherein said slot further comprises a round portion at a first end for receiving said pin, wherein said pin is substantially cylindrical.

17. The pedal assembly as defined in claim 13, wherein said tapered surface tapers at an angle in the range of five to thirty degrees.

* * * * *